United States Patent
Di Giacomo

(10) Patent No.: US 7,386,939 B2
(45) Date of Patent: Jun. 17, 2008

(54) HYDRAULIC FAST LOCKING AND LOOSENING DEVICE FOR BEARING ASSEMBLIES OF ROLLING-MILL CYLINDERS, AND CORRESPONDING METHOD OF USE

(75) Inventor: Marco Di Giacomo, Cormons (IT)

(73) Assignee: Danieli + C.Officine Meccaniche S.p.a., Buttrio (IT)

( * ) Notice: Subject to any disclaimer, the term of this patent is extended or adjusted under 35 U.S.C. 154(b) by 495 days.

(21) Appl. No.: 10/487,773

(22) PCT Filed: Sep. 2, 2002

(86) PCT No.: PCT/EP02/09785

§ 371 (c)(1),
(2), (4) Date: Feb. 25, 2004

(87) PCT Pub. No.: WO03/022471

PCT Pub. Date: Mar. 20, 2003

(65) Prior Publication Data

US 2004/0244201 A1    Dec. 9, 2004

(30) Foreign Application Priority Data

Sep. 4, 2001    (IT) .......................... MI2001A1859

(51) Int. Cl.
*B21D 53/10* (2006.01)
*B21K 1/76* (2006.01)
*B23P 17/00* (2006.01)

(52) U.S. Cl. .................... 29/898.07; 29/426.5; 29/252; 384/559; 403/349

(58) Field of Classification Search ............ 29/898.07, 29/898.08, 724, 252, 426.1, 426.5, 426.6; 384/256, 556, 559, 561; 403/348, 349
See application file for complete search history.

(56) References Cited

U.S. PATENT DOCUMENTS

| 3,080,199 | A |   | 3/1963  | Rickley           |         |
|-----------|---|---|---------|-------------------|---------|
| 3,782,796 | A |   | 1/1974  | Rickley et al.    |         |
| 3,799,636 | A |   | 3/1974  | Kersting et al.   |         |
| 4,352,229 | A |   | 10/1982 | Moore, Jr.        |         |
| 4,733,458 | A |   | 3/1988  | Benfer et al.     |         |
| 5,029,461 | A |   | 7/1991  | Lawrence et al.   |         |
| 6,149,309 | A | * | 11/2000 | Wojtkowski et al. | 384/276 |
| 6,415,489 | B1| * | 7/2002  | Martins et al.    | 29/252  |
| 6,575,638 | B2| * | 6/2003  | Martins et al.    | 384/559 |
| 7,082,800 | B1| * | 8/2006  | Muller et al.     | 72/237  |

FOREIGN PATENT DOCUMENTS

| DE | 2035698     | * | 9/1979 |
| DE | G 91 14 718 |   | 1/1991 |
| EP | 1 072 333   |   | 1/2001 |
| WO | WO 01/21333 |   | 3/2001 |

* cited by examiner

*Primary Examiner*—David P. Bryant
*Assistant Examiner*—Christopher M Koehler
(74) *Attorney, Agent, or Firm*—Sampson & Associates P.C.

(57) ABSTRACT

A hydraulic locking and loosening device (40) is set on the neck of a rolling-mill roll or back-up roll with a conical part (3) and a cylindrical part (4), and comprising an oil-film bearing (7, 8), a spacer ring (16), a thrust bearing (15), a thrust ring (17), and a threaded lock ring (18). The locking device (30) comprises a body (21) inserted at the centre in a ram (22) to form a hydraulic actuator with two annular chambers (23), longitudinal arms (31), on each of which is provided a C-shaped notch (32), and cover (24) for closing the hydraulic chambers (23). A variant of the hydraulic locking and loosening device (40) is provided with a bayonet device for its engaging on the roll end.

12 Claims, 5 Drawing Sheets

HYDRAULIC FAST LOCKING AND LOOSENING DEVICE FOR BEARING ASSEMBLIES OF ROLLING-MILL CYLINDERS, AND CORRESPONDING METHOD OF USE

This application claims priority to International Patent Application Serial No. PCT/EP02/09785 filed on 2 Sep. 2002, claiming priority to Italian Patent Application Serial No. MI2001A001859 filed on 4 Sep. 2001.

FIELD OF THE INVENTION

The present invention relates to a hydraulic fast locking and loosening device, which can be temporarily mounted on bearing assemblies that support in rotation the necks of rolls of rolling-mill, for tightening and loosening the chock of the roll neck, as well as to a method for use of said device.

STATE OF THE ART

In roll stands, and more in particular in back-up rolls, it is common practice to utilise hydraulically actuated or screw-actuated devices for axially locking rolling mill bearing assemblies in their positions on the roll necks.

In known rolling mills, such locking devices are designed as integral parts of the bearing assemblies, thereby increasing considerably the cost of said assemblies.

A further drawback of screw actuated locking devices is that they are difficult to tighten, frequently requiring the use of cables pulled by means of overhead cranes. This process increases the risks of injury for the maintenance staff and possible damage to the equipment.

Another known technique is to use hydraulically actuated portable tools that can be temporarily mounted on the bearing assemblies of the rolling mills however, such tools are designed for tightening the bearing assemblies on the roll necks, and are not useful for loosening said bearing assemblies. Thus, disassembly is carried out with other means, which in all cases comprise the use of overhead cranes and/or of other hydraulically or mechanically operated means.

SUMMARY OF THE INVENTION

Consequently, the purpose of the present invention is to overcome the problems discussed above of known state-of-the-art fast locking and loosening devices, by providing a hydraulic locking and loosening device adapted for locking and loosening bearing assemblies on roll necks of rolling mills, which is easy to operate and saves both time and work during use.

Another purpose of the present invention is to provide a hydraulic locking and loosening device which ensures economy of operation, reduces maintenance, and enables an inexpensive conversion of previous more complex mechanical and hydraulic locking systems.

Another purpose of the invention is to provide a hydraulic locking and loosening device designed to operate on roll ends with end sections that are shorter and of a simpler structure.

It is also an object of the present invention the provision of a hydraulic device for locking and loosening of bearing assemblies which is reliable and compact.

The above purposes are achieved by a hydraulic locking and loosening device having the features of claim 5. The inventive configuration of the device comprises a smaller number of components and can be associated to a roll bearing assembly of a particularly simple structure. The reduction in costs that derives therefrom for rolling-mill plants is consequently substantial. The structural simplicity of the device renders it easy to use and repair. Since it is easy to remove from its seat on the mill bearing assembly, one hydraulic locking and loosening device can be used on a plurality of roll stands.

According to a particular aspect of the present invention, there is moreover provided a method for the use of the hydraulic locking and loosening device for roll bearing assemblies, the said method having the features specified in claim 11.

According to yet another particular aspect of the present invention, there is also provided a hydraulic locking and loosening device for roll bearing assemblies having the features specified in claim 1.

The proposed bearing assembly has a simplified structure and can replace other bearing assemblies of a more complex structure. It is structurally faster and simpler to build and moreover involves a chock end plate for the reinforcement that is of a simpler form, as well as a cover that is also simpler.

BRIEF DESCRIPTION OF THE FIGURES

Further characteristics and advantages of the invention will become more apparent in the light of the ensuing detailed description of preferred, but not limitative, embodiments of a hydraulic device for locking and loosening of bearing assemblies of roll stands and of the corresponding method of use, illustrated by way of non-limiting example by means of the accompanying drawings, in which.

DETAILED DESCRIPTION OF PREFERRED EMBODIMENTS OF THE INVENTION

Figure 1:
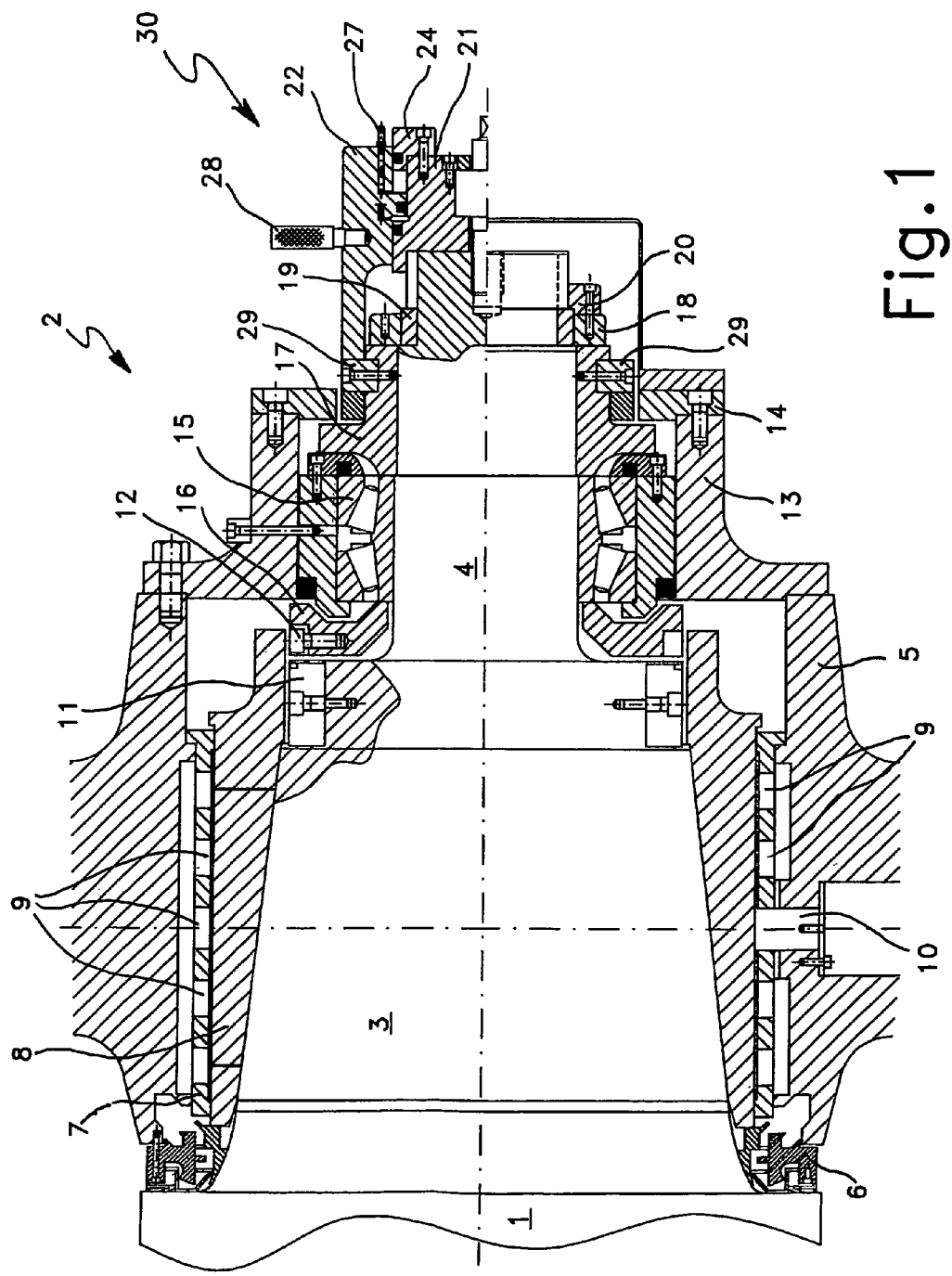
FIG. 1 shows a partial longitudinal sectional view of a bearing assembly on which a hydraulic locking and loosening device according to the invention is employed.
Figure 2:
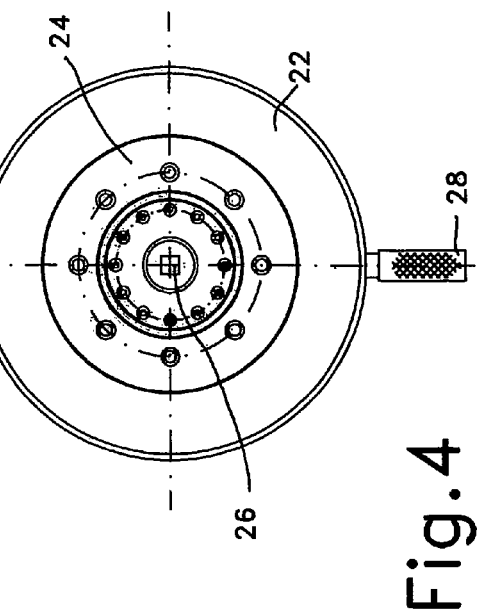
FIG. 2 shows a side view of the hydraulic locking and loosening device of the invention.
Figure 4:
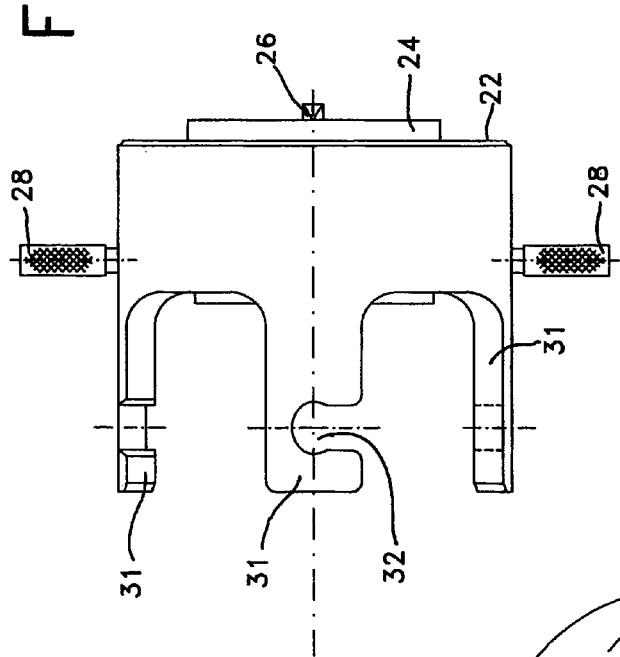
FIG. 4 shows a front view of the device of FIG. 2.
Figure 3:
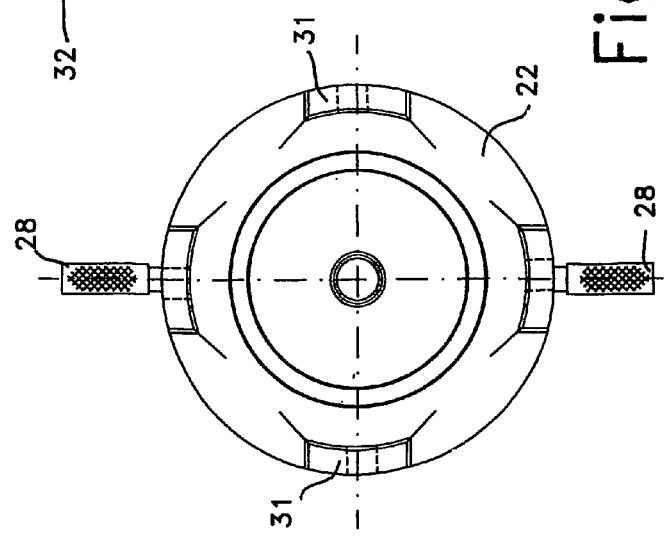
FIG. 3 shows a view from the rear of the device of FIG. 2.

With reference to FIG. 1, the end of the roll 1, in particular of a back-up roll, is represented, with a hydraulic locking and loosening device according to the present invention, globally indicated by the reference numeral 2. The roll end portion has a first tapered part 3, advantageously of a conical shape, and a second cylindrical part 4, both parts being supported in rotation in a housing of the frame 5 of the roll mill. On the side of the roll of larger diameter, there is provided a seal 6 to retain oil of the oil-film bearing. The latter comprises a bushing 7 made of white metal alloy and a sleeve 8 with tapered inner surface to adapt to the tapered portion 3 of the roll. The bushing 7 is provided with apertures for oil feed 9 and is fixed on the frame 5 by means of lock pins 10, whilst the sleeve is in turn fixed, in order to prevent rotation, on the roll neck by means of the ring keys 11 and 12. In a position corresponding to the end part of the bearing assembly there is provided chock end plate 13, which is fixed on the frame 5 by means of screws and is closed on the external side by a flange 14. Around the cylindrical part 4 of the roll neck there is fitted a thrust bearing 15, held inside a corresponding hole of the chock end plate 13. The thrust bearing 15 is held firm between a ring 16 on the inside of the neck of the cylinder and a thrust ring 17 on the outside. The thrust ring 17 is secured to the cylindrical part 4 of the roll, to prevent axial displacement, by a threaded lock ring 18, screwed on a two-part threaded ring 19 and fastened in a groove of the cylindrical part 4. Two locking keys 20 ensure locking of the ring 18 to prevent any loosening during the operation of the roll mill.

Figure 5:
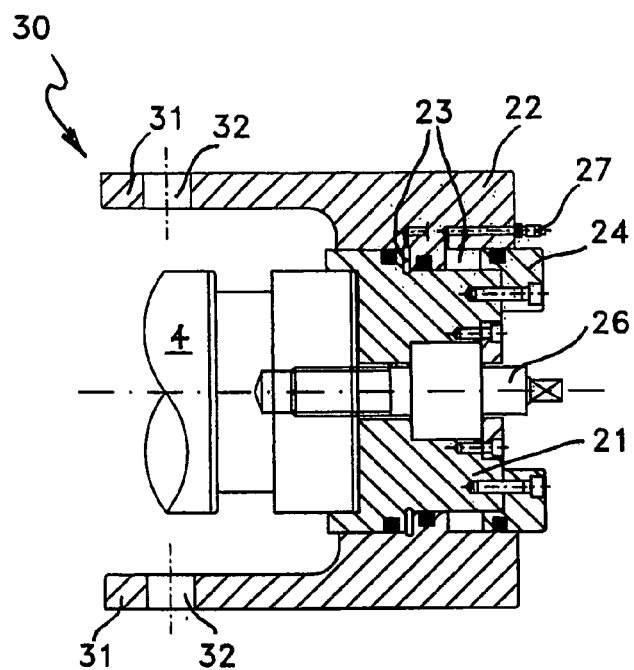
FIG. 5 shows a sectional view of the device illustrated in FIG. 2, mounted on a bearing assembly in operation.
Figure 6:
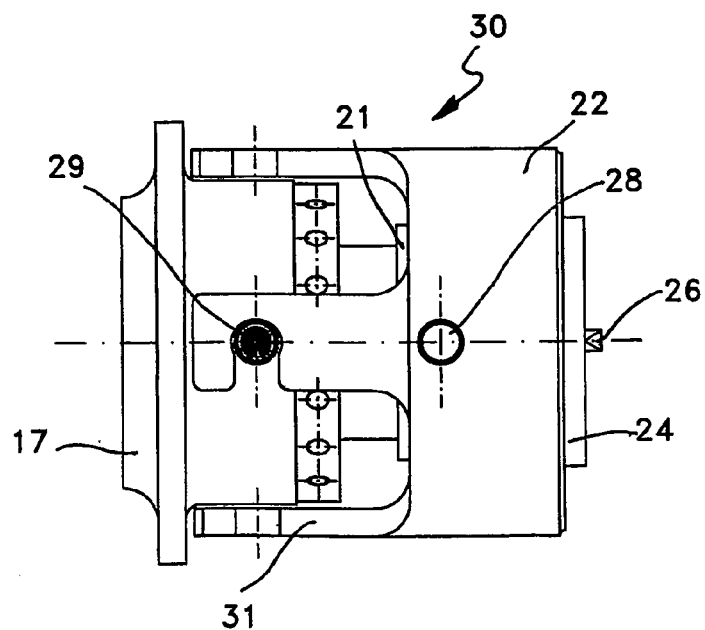
FIG. 6 shows a side view of the device of FIG. 2 installed on a bearing assembly in operation.

With particular reference to a first embodiment of the invention, in the partial section above the axis of the bearing assembly, with reference to FIG. 1, the hydraulic locking and loosening device, globally designated by the reference numeral 30, is installed on the bearing assembly for carrying out the locking operation, and comprises a cylindrical body 21, surrounded by a ram 22. Both the body 21 and the ram 22 are made in such a way as to form between them two chambers of annular shape and to form a double-acting hydraulic actuator 23. A protective end cap 24 closes the hydraulic outer chamber of the actuator 23 formed in the space between the body 22 and the ram 21. The device 30 is fixed to the back-up roll body during the locking and loosening operation by means of a fixing screw 26. A quick-release coupling 27 enables connection to a hydraulic power source for actuating the device 30. The hydraulic locking device 30 is provided with two pin engagement levers 28 for facilitating twist-lock insertion on the back-up roll end. Four locking pins 29 are set on the thrust ring 17 and fix the hydraulic device 30 to the bearing assembly during operation. The device ram 22 is provided with four arms 31, each of which has a seat or notch 32 to engage the respective locking pin 29. The engaged position of the hydraulic locking and loosening device is illustrated more clearly in FIGS. 5 and 6.

Operation of the hydraulic device 30 is described in what follows. Whenever it is necessary to install the oil-film bearing 7, 8 and the thrust bearing 15, the various elements of the bearing assembly are fitted around the end part of the roll 1. First the bushing 7 is fitted, then the sleeve 8 and the ring 16, and next the thrust bearing 15 and the thrust ring 17. The chock end plate is closed by the flange 14, the threaded ring 19 is tightened on the roll end part and the lock ring 18 is fitted on the ring 19.

The device 30 is mounted temporarily and releasably, for carrying out the operation, on the end part of the roll 1. The device ram 22 is turned through 45° about its own axis with the aid of the levers 28 to engage, with the four arms 31, the pins 29 by means of the C-shaped seats or notches 32 for blocking the device, which is further fastened on the end of the cylinder by a screw 26, which is screwed on the end part of the cylinder. The locking device is then pressurised hydraulically by means of the actuator 23, which exerts an axial force directed towards the left in FIG. 1, forcing the thrust ring 17 against the thrust bearing 15 and pushing the entire chock and the oil-film bearing assembly against the tapered part 3 of the roll neck. The lock ring 18 is then tightened against the thrust ring 17, for example by means of a special C-shaped spanner. Two locking keys 20 are fitted in roll end key-ways and screwed to the lock ring 18.

The pressure is then removed from the assembly device 30, and the latter is then detached from the roll end, first by turning the arms 31 through an angle of 45°, and then by unscrewing the device blocking screw 26.

The process of disassembly of the chock and of the bearing assembly using the same hydraulic locking and loosening device 30 is the reverse of the operation described above: the tool is used to pull the thrust ring 17 away from the chock end plate 14 and to loosen the sleeve 8.

Figure 7:
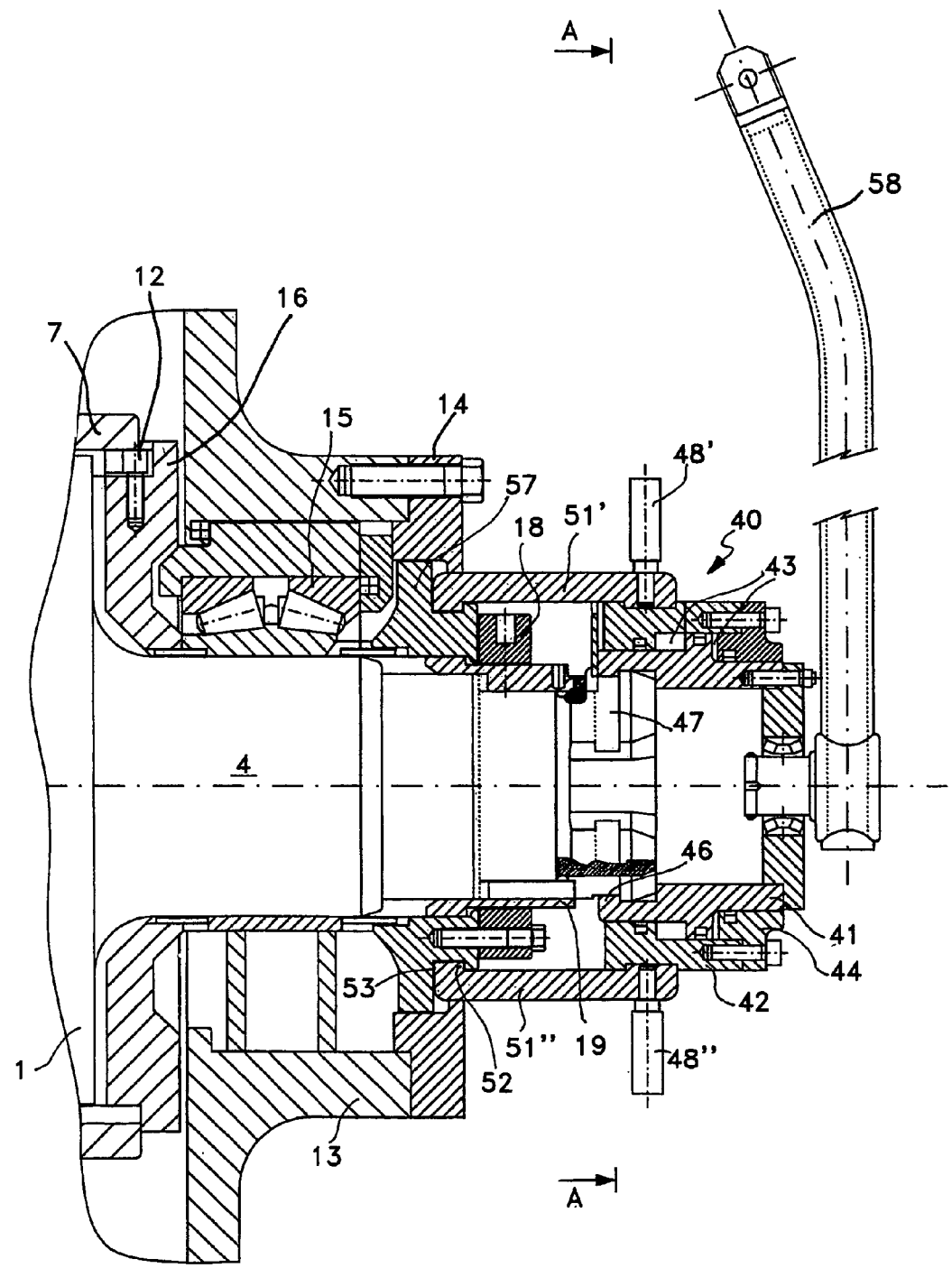
FIG. 7 shows a longitudinal section of another embodiment of a hydraulic locking and loosening device according to the invention, installed on a corresponding bearing assembly in operation.
Figure 8:
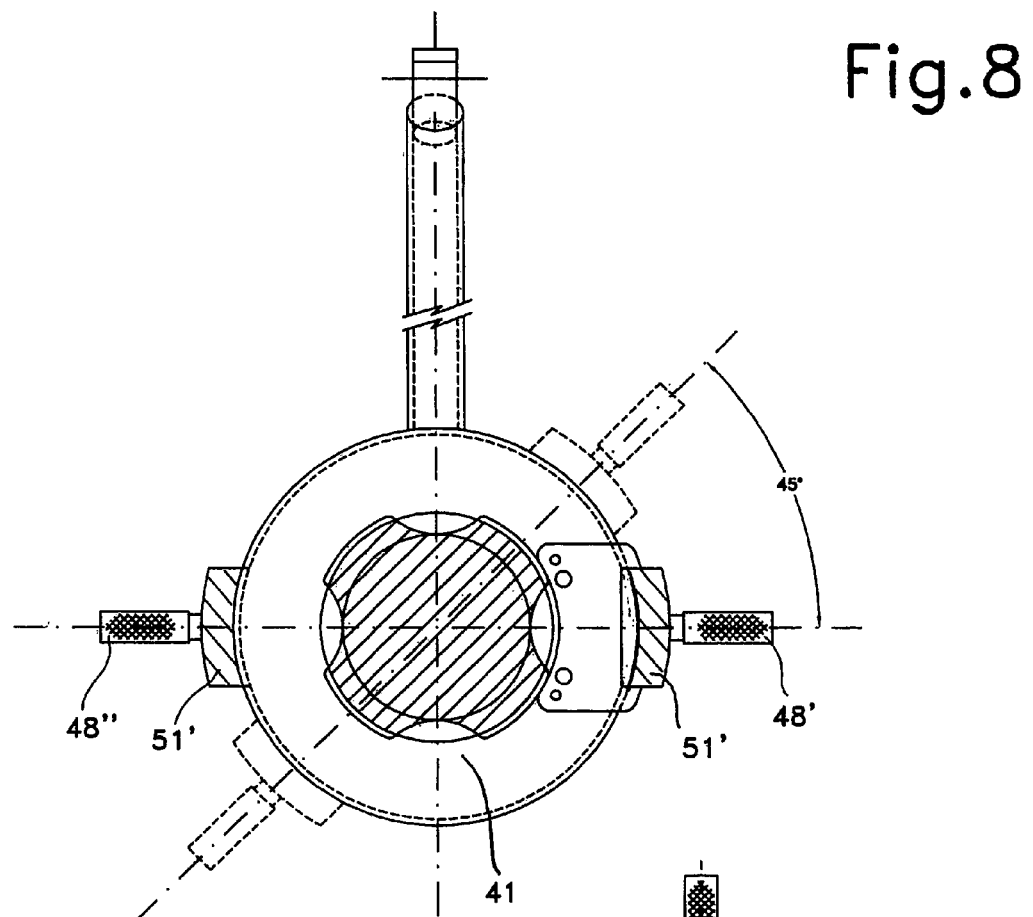
FIG. 8 represents a section, along the line A-A, of the device of FIG. 7.
Figure 9:
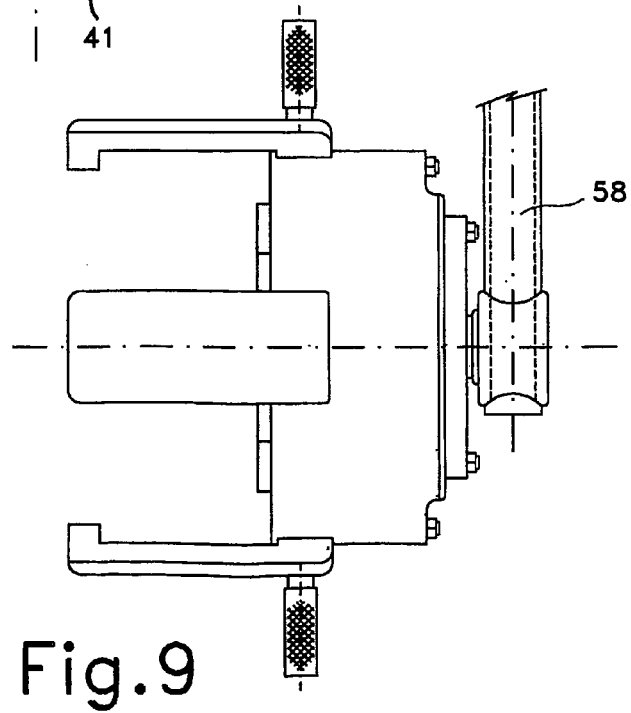
FIG. 9 represents a side view of the hydraulic device of FIG. 7.

With particular reference to a second embodiment of the invention, illustrated in FIG. 7 and following figures, the hydraulic locking and loosening device, globally indicated by reference numeral 40, is installed on the bearing assembly for locking operation, and comprises a cylindrical body 41 surrounded by a ram 42. The body 41 and the ram 42 are designed in such a way as to provide two chambers of an annular shape, which constitute a double-acting hydraulic actuator 43. An end cap 44 closes the external hydraulic chamber of the actuator 43 formed by the space between the body 42 and the ram 41.

The device 40 is fixed to the back-up roll body during the locking or loosening operation by a first twist-lock bayonet fast-block coupling. The first twist-lock bayonet device comprises a certain number of teeth 46 set on the body 41, which are adapted to engage in the annular groove 47 present on the end part of the roll 1. The first bayonet device is operated by aligning the teeth 46 with the splines on the roll end, axially translating the device or tool 40 until the teeth 46 are set on the annular groove 47 and turning it through a given angle, for example 45°. The tool is thus fixed to the roll end.

The hydraulic locking device 40 is provided with two levers 48', 48" used for tool control and for generating the rotary movement necessary for fixing the bayonet device on the roll end.

A second twist-lock device is provided for fitting the tool 40 on the thrust ring 57. The longitudinal splines present on the thrust ring 57 enable the teeth 52 of the end of the arms 51', 51" to translate axially and insert in the annular groove 53 of the thrust ring 57. When the tool 40 is turned through the same pre-defined angle, as mentioned above, the device 40 comes to be fixed to the bearing assembly for carrying out the operation. The device 40 can have a different number of arms 51, for example three or four, according to the structural needs, and the number of the corresponding splines is defined accordingly.

A quick-release coupling enables coupling of the hydraulic actuator 43 to a hydraulic pump for engaging the bayonet arrangement 52, 53 to the end of the cylinder 1 when the hydraulic pressure is applied in the inner annular chamber and for disengaging when the hydraulic pressure is applied in the outer annular chamber.

A suspension arm 58 is advantageously provided for gripping the tool with a lifting device (not illustrated in the figures). This arm facilitates manipulation of the tool during operation, or else for storing.

The operation of the device 40, when it is used for the locking of the bearing, is as described in what follows. Whenever it is necessary to fix the oil-film bearing 7 and the thrust bearing 15, the various elements of the bearing assembly are fitted around the end part of the roll 1. The bushing 7 is fitted first, followed by the sleeve 8 and the ring 16, and finally by the thrust bearing 15 and the thrust ring 17. The chock end plate is closed by the flange 14, and next the ring 19 with a thread on its outer surface is shifted onto the roll end and finally the lock ring 18 is screwed onto the ring 19.

The device 40 is installed, temporarily and releasably for carrying out the operation, at the end of the roll 1. The device is then turned about its own axis through an angle of, for example, 45°, using the levers 48 for engaging the first twist-lock bayonet device with the roll end and the second twist-lock bayonet with the thrust ring 57.

The assembly device 40 is then supplied with hydraulic fluid under pressure by means of the actuator 43, which exerts an axial force directed towards the left of FIG. 7, forcing the thrust ring 57 against the thrust bearing 15 and pushing the entire reinforcement and the oil-film bearing in close contact against the tapered part of the roll neck (not illustrated in detail in this figure). The lock ring 18 is then tightened against the thrust ring 57, for example by means of a special C-shaped spanner. If necessary, locking keys are inserted in keyways at the roll end and screwed to the lock ring 18.

The pressure is then removed from the locking device 40, and the latter is detached from the end of the cylinder by turning the bayonet devices through an angle of approximately 45° and then axially sliding the locking device away from the roll end.

The process for loosening and removing the chock and the bearing assembly using the same locking and loosening device 40 is the reverse of the one described above, in which the same tool is used for pulling away the thrust ring 57 from the chock end plate 14.

From what has been said above it is evident that the locking and loosening device according to the invention achieves all the objectives set above. Its design enables savings in terms of time and resources as compared with locking and loosening tools of the prior art because the device is not permanently connected to one cylinder only, and the structures of the roll end section, of the chock end plate and of the cover are simplified. Thanks to its simplified design and to the fact that it has only a few moving parts with standard seals and connectors, the device according to the invention requires limited maintenance. It is moreover easy to use since only three main operations are necessary to tighten a bearing assembly.

The invention claimed is:

1. A roll bearing assembly comprising a roll with an end neck having a first portion, with a tapered external surface, and a second portion, at the external end of the roll neck, with a cylindrical external surface and adjacent to said first portion, and further comprising, from the internal end to the external end of the roll neck, an oil-film bearing fitted on said first portion, a spacer ring, a thrust bearing fitted on the second portion of the roll neck and contacting the spacer ring, a thrust ring fitted on the second portion of the roll neck and contacting the thrust bearing and a threaded lock ring fitted on said second portion of the roll neck and contacting the thrust ring, said thrust ring being provided with first engagement means on its outer surface for releasably engaging a roll bearing locking and loosening device for locking and loosening operations;

wherein said first engagement means is suitable to be connected solidarily to a corresponding second engagement means provided on longitudinal arms of a locking and loosening device, such that said first and second engagement means are reciprocally engaged for fixing a hydraulic device to the roll bearing assembly in the course of both locking and loosening operations.

2. Roll bearing assembly according to claim 1, wherein the first engagement means comprises at least two pins fixed radially on the external surface of the thrust ring to engage second engagement means comprising complementary C-shaped indentations of a roll bearing locking and loosening device.

3. Roll bearing assembly according to claim 1, wherein the first engagement means comprises an annular groove on the thrust ring, said annular groove configured to engage with second engagement means comprising complementary teeth of a roll bearing locking and loosening device.

4. Roll bearing assembly according to claim 1, wherein there is provided a chock end plate with a housing designed to receive the external part of said thrust bearing.

5. A roll bearing assembly according to claim 1 wherein said locking and loosening device is an hydraulic locking and loosening device comprising a substantially cylindrical body, a cylindrical ram provided with a central hole adapted to be set around said cylindrical body at a first ram end side, such as to form at least two annular hydraulic chambers in correspondence of the surface of reciprocal contact, a cylindrical end cap to close at least one of said hydraulic chambers, and at least two longitudinal arms extending in an axial direction towards a second ram end side, each of said longitudinal arms being provided with releasable second engagement means to releasably engage a roll bearing assembly for locking and loosening operations;

wherein the second engagement means are suitable to be connected solidarity to the corresponding first engagement means provided on the thrust ring of the roll bearing assembly, such that the first and second engagement means are reciprocally engaged for locking said hydraulic device to the roll bearing assembly in the course of both locking and loosening operations.

6. Roll bearing assembly according to claim 5, wherein said releasable engagement means comprise a C-shaped indentation on said longitudinal arms.

7. Roll bearing assembly according to claim 6, in which the cylindrical ram is provided with four longitudinal arms.

8. Roll bearing assembly according to claim 7, wherein there is provided a screw, set axially, for fixing said device to one roll end during operation.

9. Roll bearing assembly according to claim 5, wherein said releasable engagement means comprise bayonet devices, of the twist-lock type.

10. Roll bearing assembly according to claim 9, wherein one of said bayonet devices of the twist-lock type is set on said longitudinal arms, and the second is set on said cylindrical body.

11. A method for locking bearing assemblies on a roll end by means of a hydraulic device according to claim 5, comprising the following steps:

a) fitting in the following order a bushing, a tapered sleeve, a spacer ring, a thrust bearing, and a thrust ring on the neck of a roll;

b) closing a chock end plate by means of a flange;

c) fitting of a threaded ring on the roll end part and of a lock ring around said ring;

d) assembling the hydraulic device around the end part of said roll;

e) rotating the hydraulic device about its own axis by an appropriate angle, to engage operatively first engagement means located on said thrust ring, with second engagement means located on said hydraulic device so as to reciprocally lock the hydraulic device and the thrust ring;

f) fixing said hydraulic device to the end of the cylinder by actuating fixing means on the end of the cylinder;

g) pressurizing the hydraulic device by means of an actuator, so as to exert an axial force and to force said thrust ring against said thrust bearing and to push the chock and the oil-film bearing against said roll neck;

h) tightening said lock ring to the thrust ring;

i) releasing the pressure from said hydraulic device;

j) rotating the device by an appropriate angle; and k) removing said fixing means and extracting the hydraulic device.

12. A method for loosening of bearing assemblies from a roll end by means of a hydraulic device according to claim 5, comprising the following steps:

a) assembling the hydraulic device on the end part of said roll;

b) rotating the device about its own axis through an appropriate angle, to engage operatively first engagement means located on said thrust ring, with second engagement means located on said hydraulic device thus reciprocally locking the device and the thrust ring;

c) fixing the hydraulic device to the roll by actuating fixing means on the roll end;

d) loosening said lock ring from the thrust ring;

e) opening of a chock end plate, releasing it from a flange;

f) pressurising the hydraulic device by means of an actuator, thus exerting an axial force and forcing said thrust ring away from said thrust bearing, freeing the chock and the oil-film bearing from the pressure on said roll neck;

g) detaching said hydraulic device and said thrust ring from said roll end; and i) extracting, in the following order from the neck of the roll: a thrust bearing, a spacer ring, a tapered sleeve, and a bushing.

* * * * *